United States Patent [19]

Noriega

[11] Patent Number: 4,717,193
[45] Date of Patent: Jan. 5, 1988

[54] SHELF FOR VEHICLE CAB

[76] Inventor: Ernest Noriega, 8608 E. Coronado, Scottsdale, Ariz. 85022

[21] Appl. No.: 852,734

[22] Filed: Apr. 16, 1986

Related U.S. Application Data

[63] Continuation-in-part of Ser. No. 574,137, Jan. 26, 1984, abandoned.

[51] Int. Cl.$^4$ ............................................... B60R 5/00
[52] U.S. Cl. .................................. 296/37.7; 296/37.8; 108/149; 108/45; 248/544
[58] Field of Search .................... 296/37.1, 37.7, 37.8; 224/43.42, 311, 312; 108/149, 42, 44, 45; 211/135; 248/544; 312/245

[56] References Cited

U.S. PATENT DOCUMENTS

| | | | |
|---|---|---|---|
| 1,964,339 | 6/1934 | Brassell | 206/19.5 |
| 2,319,747 | 5/1943 | Osborne | 211/31 |
| 2,568,046 | 9/1951 | Wilkinson | 224/42.45 |
| 2,929,537 | 3/1960 | Price | 223/38 |
| 2,929,539 | 3/1960 | Safreno | 224/1 |
| 3,648,626 | 3/1972 | Schuster | 108/42 |
| 3,692,266 | 9/1972 | Jacobs | 248/224 |
| 3,773,378 | 11/1973 | Lewis | 296/37 |
| 3,847,316 | 11/1974 | McInnes | 244/42.1 |
| 3,856,192 | 12/1974 | Nelson | 224/42.1 |
| 4,079,987 | 3/1978 | Bumgardner | 296/37.7 |
| 4,120,436 | 10/1978 | Burch | 224/42.1 |
| 4,226,460 | 10/1980 | Schmidt | 296/37.7 |
| 4,238,103 | 12/1980 | Kurtz . | |

FOREIGN PATENT DOCUMENTS 448022  8/1934  United Kingdom .

Primary Examiner—Robert B. Reeves
Assistant Examiner—Russell D. Stormer
Attorney, Agent, or Firm—LaValle D. Ptak

[57] ABSTRACT

A shelf for carrying articles in a vehicle, such as a pickup truck, is formed from a single piece of metal, such as steel or aluminum to provide an elongated shelf having an up-turned and inwardly angled rear lip to prevent articles placed on the shelf from falling off. Mounting brackets are attached to the opposite ends of the shelf. The mounting brackets each have flange portions which extend inwardly toward one another over the shelf member itself; and these flange portions have holes in them to permit mounting of the shelf in the sunvisor mounting holes already in the vehicle. When installed, the mounting brackets are essentially concealed and the shelf is spaced a short distance from the roof of the vehicle immediately adjacent the upper edge of the windshield.

15 Claims, 13 Drawing Figures

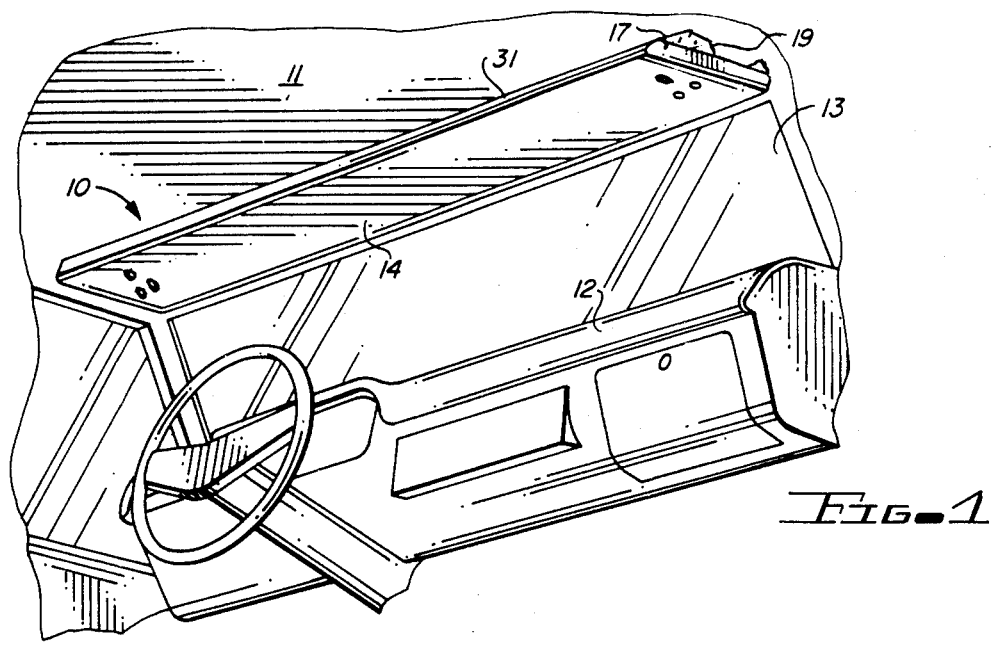
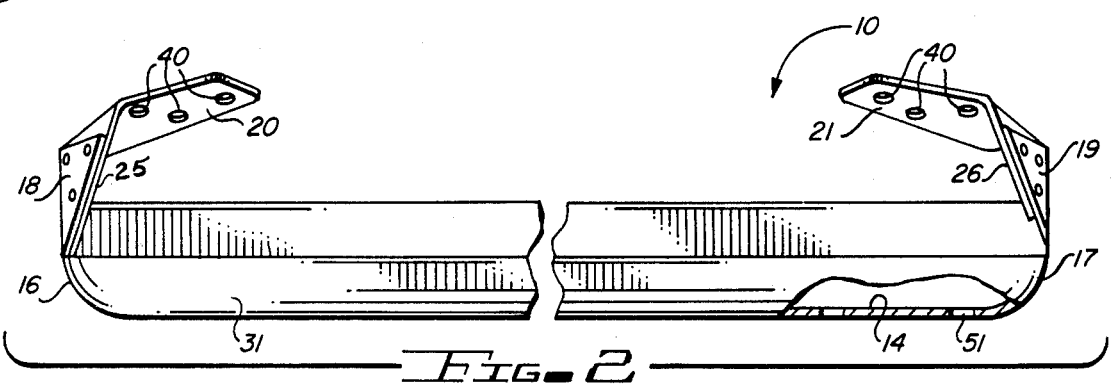
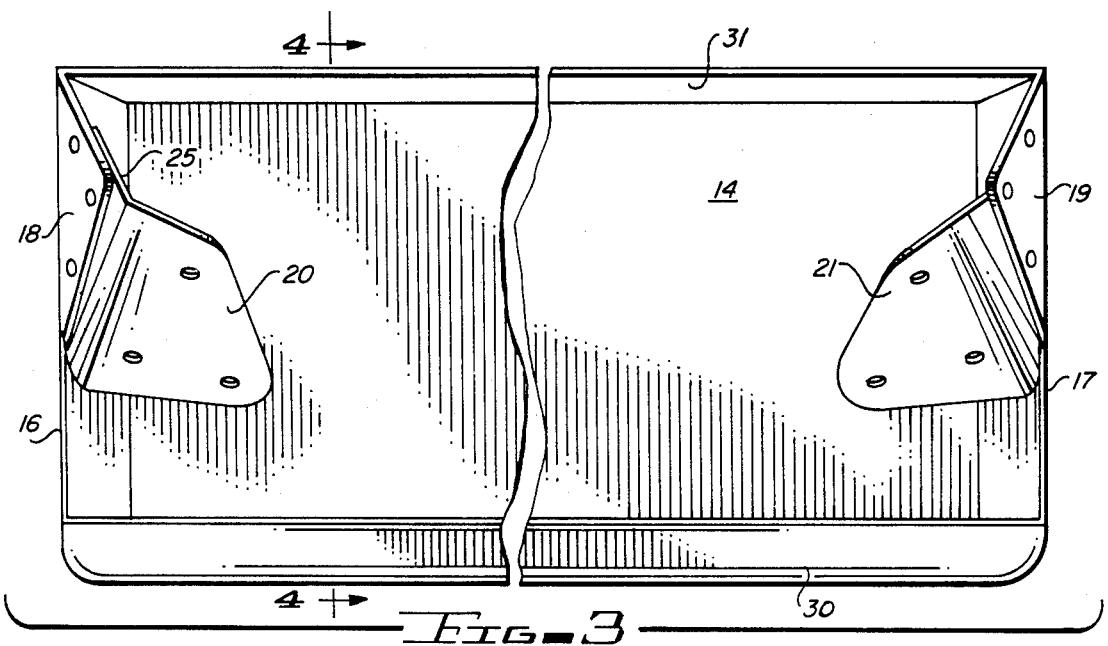

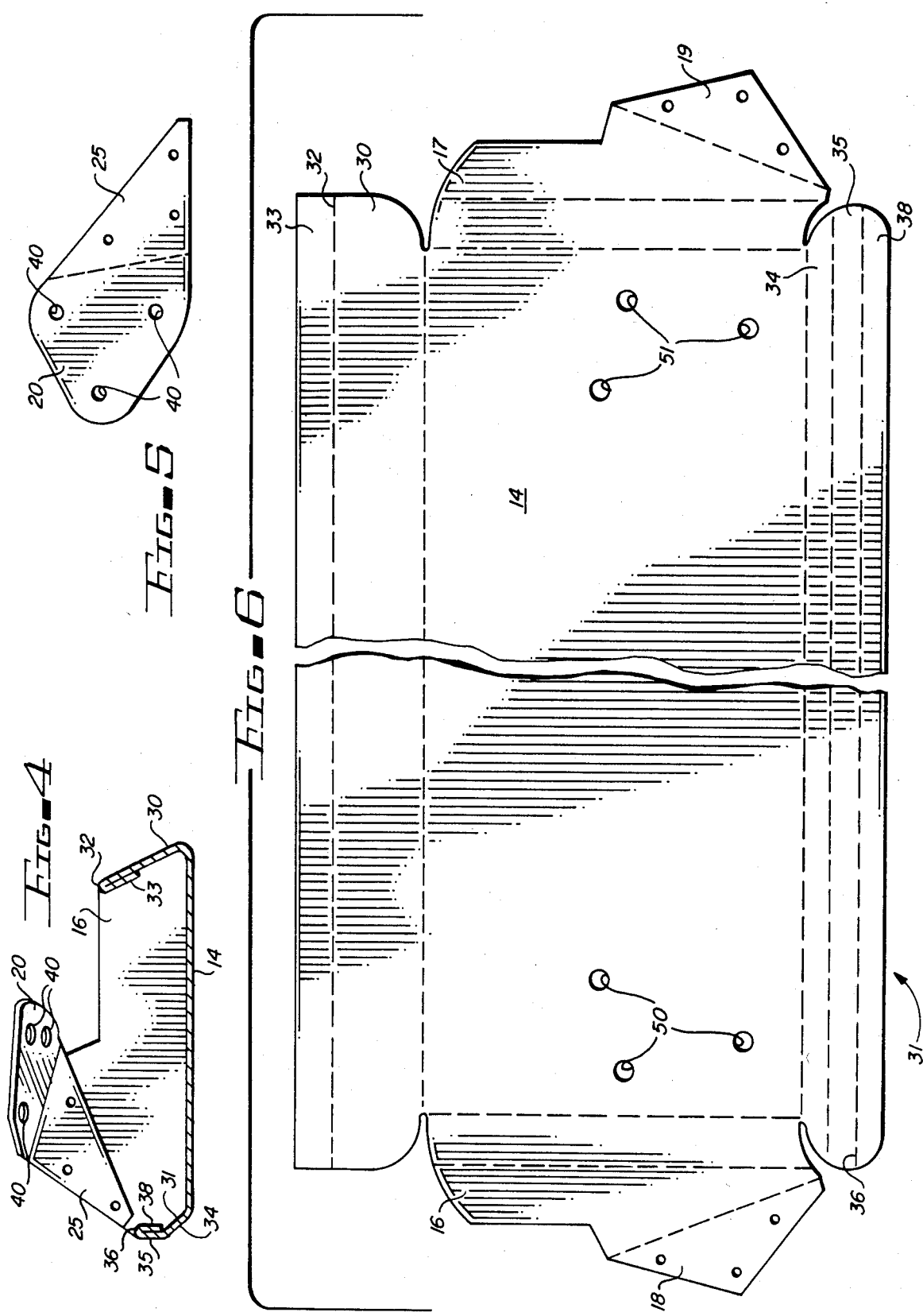

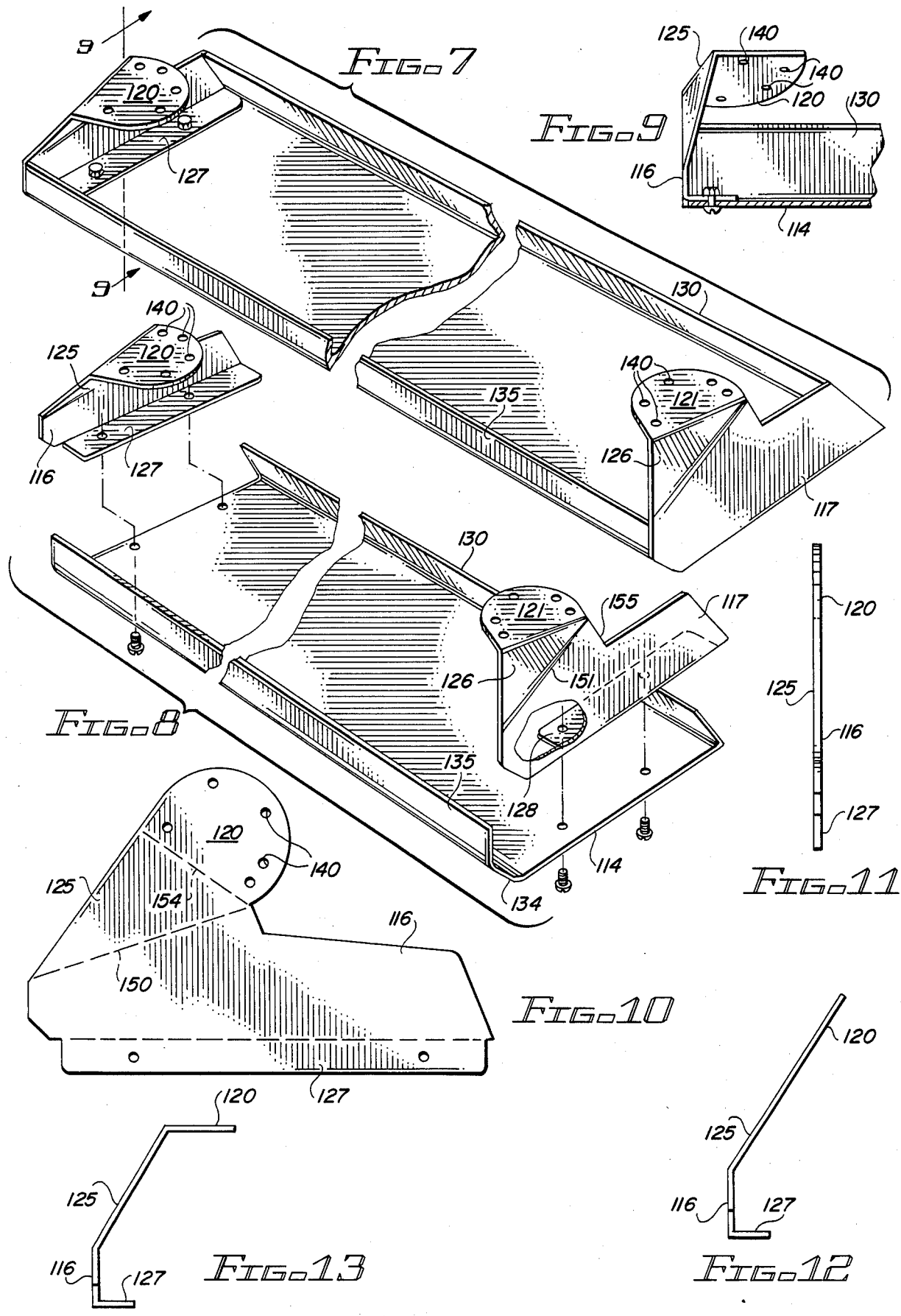

SHELF FOR VEHICLE CAB

RELATED APPLICATION

This application is a continuation-in-part of application Ser. No. 574,137, filed on Jan. 26, 1984, now abandoned.

BACKGROUND OF THE INVENTION

In automotive vehicles such as automobiles, pick-up trucks, recreational vehicles and the like, a problem frequently arises in finding sufficient storage space for various articles which are to be carried in the vehicle. Most automobiles and light trucks have glove compartments in them. These glove compartments, however, are of relatively limited capacity and are suitable only for storing small articles such as maps, flashlights and the like. Glove compartments are entirely unsuited for storage of large articles such as rifles, shotguns, and many tools. In addition, glove compartments usually are located at the right-hand end of the vehicle dashboard and are difficult to reach from the driver's seat. This is particularly true of pick-up trucks which have a relatively wide body width. If a flashlight or small fire extinguisher is placed in a conventional glove compartment, it usually is filled or nearly filled by such an article, thereby rendering storage of other items in the glove compartment difficult or impossible.

Some vehicles have additional pockets or compartments placed in the doors and, in the case of pick-up trucks, there may be limited storage behind the seat. Behind-the-seat storage, however, is inconvenient since usually it is necessary for the vehicles to be stopped and the driver and passenger to be out of the seat to permit pulling the back forward to gain access to anything stored behind it. Many recent model automobiles and trucks also incorporate tape players as part of the sound system, and it is necessary to find a storage location for tapes carried into the vehicle for playing in such players.

One result of this dearth of storage space is the placement of a variety of articles on the dashboard of the vehicle. This is unsightly, the sun can cause substantial damage to or actually destroy any tapes or heat-sensitive plastic articles placed in such a location, and articles placed on top of the dashboard create a distraction to the driver and interfere with the operation of the defrosters. To accommodate guns for hunters or law enforcement officers, it has been a common practice to locate a gun rack with mountings on opposite sides of the rear window of pick-up trucks and the like. This, however, has an obvious disadvantage of making the gun readily visible from the outside of the vehicles, thereby creating a tempting target for thieves when the vehicle is unattended. When a gun is in place on such a rack, it further interferes with vision through the rear window, thereby creating a safety hazard.

In an effort to provide additional and unobtrusive storage for vehicles, various attempts have been made in the past for mounting racks, storage units, or shelves adjacent the roof of the vehicles. Many such racks are custom designed cabinets or compartments for housing stereo components, CB radios and other electric gear. A wide variety of racks have been devised for storing tape cartridges to be played in the vehicle cartridge tape player.

Two patents which disclose general purpose shelves mounted adjacent the roof of a vehicle cab are the patents to Wilkinson, U.S. Pat. Nos. 2,568,046, and Safreno, 2,929,539. The Wilkinson patent discloses a shelf which has a bowed edge to conform to the vehicle roof. This edge is used to prevent objects from sliding off the shelf and falling down between the shelf and the vehicle windshield. The shelf of the Wilkinson patent, therefore, must be tailored somewhat to the ceiling lines of the different vehicles in which it may be installed. The ends of the Wilkinson shelf are supported by means of a pair of brackets which have holes in them to permit attachment of the brackets at the sunvisor connection points in the vehicle. These brackets extend downwardly out from the main shelf portion and are visible when the shelf is connected in place. The shelf itself then extends upwardly to somewhat parallel the roof line directly adjacent the top edge of the windshield. As shown in Wilkinson, this shelf is capable of storing articles such as maps, books, papers and the like.

The shelf shown in the Safreno patent is an essentially horizontal shelf with specifically designed brackets on it for holding a rifle or similar firearms. Attachment of the shelf to the vehicle is made by means of a pair of down-turned brackets at each end. These brackets have holes in them and are attached to the sidewalls of the vehicle by means of screws or bolts fastened into holes which are drilled into the vehicle body. The attaching brackets are visible when the shelf is in place.

Other efforts to provide increased storage in a vehicle by means of a shelf located at or adjacent the ceiling are disclosed in the patents to McInnes, U.S. Pat. No. 3,847,317, and Nelson, 3,856,192. The McInnes patent is a roof-top tape storage rack which is attached directly to the vehicle roof at a location above the upright portion of the seat of the vehicle (or the front seat of an automobile having front and rear seats). The mounting attachements are clearly visible and it is necessary to drill additional holes in the ceiling of the vehicle. The rack of McInnes is for the sole purpose of storing tape cartridges. The Nelson patent also discloses a tape cartridge storage rack mounted above the vehicle windshield header. It uses L-shaped mounting brackets on the ends which are attached to and carried by the inside upper front window moldings. This requires addition holes to be drilled in the vehicle roof or requires the moldings to be removed and replaced to clamp the brackets between them and the vehicle body. If, as is the case of many vehicles, these moldings are made of plastic, sufficient structural strength may not be present in them to permit a reliable installation of the rack, particularly if it is heavily loaded with tape cartridges.

Other storage cabinets, requiring substantially custom installation, are available for location above the dashboard of the vehicle adjacent the upper edge of its windshield. Since such storage cabinets, as so far are known to applicant, require custom design and fitting and, further, require the drilling of holes in the vehicle roof or body frame components, they are not universally adaptable and generally are not of the type which can be installed by the vehicle owner himself.

It is desirable to provide a vehicle shelf which has substantially concealed mountings, which does not require the drilling of any additional holes in the vehicle cab and which is capable of holding a variety of different kinds of items in a location adjacent the vehicle roof while, at the same time, being practical, simple to manufacture, and of relatively low cost.

SUMMARY OF THE INVENTION

Accordingly, it is an object of this invention to provide an improved storage shelf for motor vehicles.

It is another object of this invention to provide an improved storage shelf for motor vehicles which is mounted adjacent the roof of the vehicle.

It is an additional object of this invention to provide an improved storage shelf for a motor vehicles which is of simple construction and which is mounted in pre-existing screw openings already present in the vehicle.

It is yet another object of this invention to provide an improved vehicle storage shelf having simplified construction for mounting in the interior cab or a motor vehicle.

In accordance with a preferred embodiment of the invention, a vehicle shelf comprises a main elongated shelf member having a front edge, a rear edge, and first and second up-turned ends. First and second mounting brackets are attached to the first and second ends, respectively, of the shelf member. Each of the mounting brackets have a flange portion on them which extends above the shelf and inwardly toward the corresponding flange portion on the other mounting bracket. Thus, the flange portions of the mounting brackets overlie the shelf member and suspend and space it downwardly when it is in place in a vehicle. The flange portions of the mounting brackets are attached to a vehicle roof to position the shelf in the vehicle for storing articles thereon.

BRIEF DESCRIPTION OF THE DRAWINGS

FIG. 1 is a perspective view of a vehicle shelf in accordance with a preferred embodiment of the invention illustrated as mounted in the cab of a vehicle;

FIG. 2 is a front view of the vehicle shelf shown in FIG. 1;

FIG. 3 is a top view of the shelf shown in FIGS. 1 and

FIG. 4 is a cross-sectional view taken along the line 4—4 of FIG. 3;

FIGS. 5 and 6 are plan views of the components which are used to make the vehicle shelf shown in FIGS. 1 through 4;

FIG. 7 is a perspective view of another embodiment of the invention;

FIG. 8 is an exploded, perspective view of the embodiment of FIG. 7;

FIG. 9 is a cross-sectional view taken along the line 9—9 of FIG. 7; and

FIGS. 10 to 13 show details of one of the components of FIG. 7.

DETAILED DESCRIPTION

Reference now should be made to the drawings in which the same reference numbers are used throughout the different figures to designate the same or similar components.

The vehicle shelf 10 of a preferred embodiment of this invention is shown in FIG. 1 as attached to the roof 11 of a typical vehicle having a dashboard 12 and a windshield 13 in the relative positions shown in FIG. 1. The shelf 10 comprises an elongated base 14 with up-turned ends 16 and 17 (shown most clearly in FIGS. 1 and 2). The ends 16 and 17 terminate in generally triangular-shaped bracket attaching members 18 and 19 for use in attaching separate mounting brackets 20 and 21 to the shelf.

The triangular-shaped bracket attaching members 18 and 19 are bent at an angle slightly inwardly from the vertical plane of the sides 16 and 17, and the generally L-shaped mounting brackets 20 and 21 are attached to the members 18 and 19 by means of rivets, spot welding or the like. The angle between the lower extensions 25 and 26 and the upper portions of the brackets 20 and 21, respectively, is selected in accordance with the particular make and style of vehicle in which the shelf is to be installed. For any given make and style (or model) of vehicle, the angle of bend between the portions 20/25 and 21/26 of the mounting brackets is fixed. In a typical installation, the angle from vertical at which the members 18 and 19 are bent is on the order of 100°. A typical angle between the portions 20 and 25 (and similarly, the portions 21 and 26) is approximately 152°. These two angles establish the location of the inwardly facing portions 20 and 21 of the mounting brackets to orient them properly and to orient the shelf bottom 14 horizontally for the particular vehicle in which the shelf is to be installed. For different makes and models of vehicles, these angles must be determined in advance. Once this has been done, however, all of the shelves 10 for that same vehicle will have consistent angles, and the parts may be pre-bent in accordance with these angles.

To provide improved strength for the elongated shelf 10, and further, to hold articles placed on the shelf in a manner to prevent them from falling out whenever the vehicle is accelerated rapidly or stops rapidly, lips 30 and 31 are provided on the rear and front edges of the shelf member 14 (as shown most clearly in FIG. 4). The rear lip 30 is bent at an angle of substantially 60° with respect to the plane of the base 14. This angle, however, is selected to cause the plane of the lip 30 to be essentially parallel with the windshield 13 of the vehicle. Thus, for vehicles made by different manufactures or different models of the same manufacturer's vehicle, this angle may vary somewhat. By making the plane of the lip 30 parallel to the windshield 13, it is possible to mount the shelf 10 in close proximity to the windshield, thereby causing it to be located, as much as possible, directly above the dashboard 12 of the vehicle. The upper edge 32 of the rear lip 30 is bent back over on itself to form a downwardly extending portion 33 which directly overlies the inside side of the lip 30. This provides a rounded edge 32 on the lip and further increases the strength of the shelf.

The front lip 31 comprises a first or lower section 34 bent at an angle of approximately 35° to 45° outwardly from the base 30. This portion extends for a short distance where a second bend causes the upper section 35 of the lip 31 to have a vertical or perpendicular orientation to the base 14. As is the case with the lip 30, the upper edge 36 of the lip 31 is bent back over on itself to have a downwardly extending portion 38 located on the inside side of the lip 31. This provides additional structural stability and strength to the shelf 10.

FIG. 6 shows the blank of material, typically steel, of which the base 14, the ends 16 and 17, attaching brackets 18 and 19, and front and rear lips 31 and 30, respectively, are formed. All of these parts may be made from a single piece of steel which is bent along the dotted fold lines illustrated in FIG. 6 to form the vehicle shelf unit shaped as illustrated in detail in FIGS. 1, 2, 3, and 4. By bending the various parts along the dotted fold lines indicated in FIG. 6, the entire structure of the vehicle shelf unit 10, with the exception of the mounting brackets 20/25 and 21/26, is formed. The corners then may be brazed or welded to form the finished product. A typical material which is used in plate steel which provides structural rigidity and strength to the finished product. Other materials, however, could be used. It is possible to fabricate the shelf from an aluminum extrusion to which ends 16 and 17 and mounting extensions 18 and 19 may be attached. It also may be possible to mold the shelf unit out of a high-strength, high-impact light plastic.

In addition to the single piece shown in FIG. 6 which comprises the bulk of the shelf unit, two other components are used to finish the shelf unit prior to its installation in a vehicle. These are the two mounting brackets 20/25 and 21/26. The blank for the bracket 20/25 is shown in FIG. 5, and the dotted line indicates the line along which the bracket is bent to assume the shape or configuration shown most clearly in FIGS. 2 and 3.

As noted in FIGS. 4, 5 and 6, there are small holes indicated in the extension 18 and the portion 25 of the two parts which are to be assembled together. These holes are in a generally triangular configuration and constitute rivet holes, if that is the mode of attachment of the parts which is desired. Alignment of the three small holes in the portion 25 and in the extension 18 with one another in accordance with the preestablished angle for the vehicle in which the shelf is to be attached is first accomplished, the parts then are riveted together to securely attach them as shown in FIGS. 2 and 3. Similarly, the brackets 20/25 and 21/26 are attached to the extensions 18 and 19, and the entire unit is ready for installation in a vehicle.

To install the shelf 10 in a vehicle, the sunvisor sockets or similar members are removed. Three holes 40 are located in the mounting bracket 20 and three similar holes 41 are located in the mounting bracket 21. These holes 40 and 41 are aligned respectively with the corresponding screw wall openings into which the normal vehicle sunvisors are mounted. Thus, with the sunvisors removed, the holes are aligned with the socket screw wall openings on the right-hand side of the vehicle cab. The screws previously used to mount the sunvisor then are screwed into these openings to secure the shelf unit in place in the vehicle in the position shown in FIG. 1. It is not necessary to drill any additional holes in the vehicle cab; and if it is ever desired to remove the shelf 10 and return the vehicle to its original condition, this readily may be done. If the shelf is removed, the conventional sunvisor brackets then may be reinstalled.

Since the backets 20 and 21 turn inwardly to face one another, they essentially are concealed when the shelf 10 is in place as shown in FIG. 1. This could present a problem in installation, however, since the distance between the shelf base 14 and the vehicle roof is generally of the order of four to six inches. To facilitate the installation, two sets of three holes 50 and 51 are formed through the bottom of the base 14. These holes are aligned with the corresponding holes 40 and 41 in the mounting brackets 20 and 21, and are of sufficient dimension to permit the shank of a screwdriver to pass through them. Thus, a screwdriver is inserted through the appropriate one of the holes 50 and 51 and aligned with the screws in place in the corresponding one of the holes 40 and 41 to either install or remove the shelf. The holes 50 and 51 are relatively small and are not conspicuous. Thus, they do not interfere with the use of the shelf subsequently.

As a result of the configuration which is shown and which has been described above, a compact simple-to-manufacture and strong vehicle shelf is the result. The shelf may accommodate a rifle and several boxes of ammunition or a variety of other objects, such as maps, tape cassettes, flashlights, fire extinguishers and the like. The inwardly turned rear lip 30 prevents articles from sliding off the shelf and falling onto the dashboard 12 in the event of a sudden stop. In addition. the double bend in the front lip 31 approximates a rounded configuration to lessen the chances of injury in the event of an accident. This edge 31 also may be covered with a suitable resilient impact-absorbent material, if desired.

The entire shelf unit may be covered with fabric or it may be painted to match the interior of the vehicle, if desired. When the shelf 10 is in place, it is an unobstructive and attractive installation in the vehicle. Sunvisors may be attached to the underside of the portion 14; and because of the location of the shelf 10, no significant visibility restriction occurs in the view from the seat of the vehicle through the windshield 13.

FIGS. 7 through 13 illustrate another embodiment of the invention. In the embodiment of FIGS. 7 through 13 the self unit comprises the same number of parts as the embodiment of FIGS. 1 through 6, but the construction is carried out in a different manner. The installed unit, however, has the same overall configuration and position as is accomplished by the embodiment of FIGS. 1 through 6.

A primary difference between the embodiment of FIGS. 7 through 13 and the embodiment of FIGS. 1 through 6 is that the main portion of the shelf of the embodiment of FIG. 7 is formed from a continuous extrusion. The parts comprising the bottom of the shelf 114, the rear lip 130 and the two sections 134 and 135 of the front lip all are formed from a single extrusion of a suitable material such as aluminum. Because an extruded material is used, there is no bent back or bent over edge on either of these lips. If an aluminum extrusion is used for the shelf 114, the material employed is somewhat thicker than the thickness of the steel shelf of the type shown in FIGS. 1 through 6.

In place of the bent over or up-turned ends which are used to form a support for the connecting brackets in the embodiment of FIGS. 1 through 6, the ends of the shelf unit of FIGS. 7 through 13 are open. Integral mirror-image bracket units 116 and 117 are formed for the two ends for attachment to the bottom 114 of the shelf extrusion.

The bracket 116 is shown in its blank or flattened form in FIG. 10. Bracket 117 has an identical shape, but is bent in the opposite direction from the bracket 116 to form the inwardly facing portion 120 and 121 shown in FIGS. 7 and 8.

In FIG. 10, the different parts of the bracket 116 are shown separated by dotted lines indicating the bending lines for forming the finished bracket. To attach the bracket 116 and 117 to the bottom 114 of the shelf, a lower lip 127 and 128, respectively, is bent 90° inwardly from the main end portion 116. Holes are formed through the connecting lips 127 and 128 to correspond with mating holes in the bottom of the shelf 114, as shown most clearly in FIG. 8. Suitable fasteners such as self-tapping screws or bolt and nut connectors are used to attach the brackets to the shelf as a final step in assembly.

Intermediate portions 125 and 126, corresponding most closely with the composite portions 18/25 and 19/26 of FIGS. 1 through 6, respectively, are formed by bending the upper portion of the end bracket along the lines 150 and 151 inwardly at the same angle as the member 18 and 19 of the embodiment of FIGS. 1 through 6. The inwardly facing connecting portions 120 and 121 then are bent along the lines 154 and 155, respectively, at angles which correspond to the angles of the portions 20 and 21 of the embodiment of FIGS. 1 through 6. As mentioned in conjunction with that embodiment, the angles of the bends along these different lines differs somewhat for different makes and models of vehicles so that different end brackets need to be provided for different vehicles. Once the angles for a particular vehicle have been determined, however, all of the end brackets 116 and 117 have the different portions formed with consistent angles, and the brackets may be pre-bent in accordance with those angles. The shelf itself, however, is the same for all vehicles and merely is cut into the desired length suitable for the particular vehicle. Since continuous extrusions are made to form the shelves, expensive stamping machinery is not necessary to form different shelves of different lengths and different configurations for each different vehicle. The construction of the shelf unit in accordance with the embodiments of FIGS. 7 through 13 is less expensive than with the embodiment of FIGS. 1 through 6.

The installation of the embodiment of FIGS. 7 through 13 also is somewhat different from that described for the earlier embodiment. To install a shelf unit of the type shown in FIGS. 7 through 13, suitable mounting holes 140 are aligned with the sunvisor attachment holes of the particular vehicle. A number of different holes 140 are formed in the portions 120 and 121 to provide a "universal" set of holes suitable for alignment with the sunvisor holes in most vehicles with which the shelf unit may be used.

The sunvisors are removed, as in the case of the embodiment of FIGS. 1 through 6. The brackets 120 and 121 are then fastened through the sunvisor holes prior to attachment of the shelf unit 114 to the brackets. After attachment of the end brackets in the sunvisor mounting holes has been accomplished, the shelf unit 114 is attached to the lips 127 and 128 with fasteners, as described previously, as the final step in assembly of the shelf unit in the vehicle. Thus, it is not necessary to have the enlarged holes 50 and 51 formed in the shelf unit 114 of the embodiment of FIGS. 7 through 13 since ready access to the screws or other fasteners used to attach the inwardly turned portions 120 and 121 to the sunvisor attachment holes easily is made when the shelf 114 is not in place. In all other respects, the finished shelf unit, once it is in place in the vehicle, is the same as the unit described previously in conjunction with FIGS. 1 through 6 and the unit of FIGS. 7 through 13 functions in the same manner as the embodiment of FIGS. 1 through 6.

The foregoing description is directed to the preferred embodiments of the invention shown in FIGS. 1 through 13 of the drawings. This description and these embodiments, however, are intended to be illustrative only and not as limiting. Various changes and modifications will occur to those skilled in the art without department from the true scope of the invention.

I claim:

1. A vehicle shelf for mounting near the roof of a vehicle adjacent the windshield of the vehicle, said shelf including in combination:

an elongate shelf member having a predetermined length corresponding substantially to the width of the vehicle roof, said shelf member having a front edge, a rear edge, and first and second up-turned ends extending slightly inwardly toward each other, an up-turned rear lip on the rear edge thereof for location adjacent a vehicle windshield, wherein said rear lip extends upward from said shelf member and inwardly at a predetermined angle to overlie said shelf member, and an upturned front lip on the front edge of said shelf member to prevent articles placed on said shelf member from falling off;

first and second mounting brackets adapted to be attached to the first and second ends respectively of said shelf member, each of said mounting brackets having a first portion attached to a respective up-turned end and extending upwardly from the respective end of said shelf member to which such bracket is attached and having a second portion thereon for attachment to the sunvisor mounting holes in a vehicle roof and extending at an angle to said first portion and further inwardly toward the corresponding second portion of the other of said mounting brackets to overlie said shelf member and to suspend said shelf member a short distance downwardly from the evhicle roof substantially concealing said mounting brackets from view when said shelf member is mounted in place in a vehicle, the distance between said second portions of said mounting brackets being less than said predetermined length;

means for attachment said first and second mounting brackets to the first and second ends respectively of said shelf member; and means for facilitating the attachment of said second portion of said mounting brackets to the sunvisor mounting holes.

2. The combination according to claim 1 wherein said elongate shelf member has identical cross-sections throughout its length.

3. The combination according to claim 1 wherein at least said elongate shelf member, said front lip and said rear lip all are formed from a single sheet of metal bent and folded to form such components of such vehicle shelf.

4. The combination according to claim 3 wherein said front lip and said rear lip have the upper edges thereof formed by folding the material of said lips over by 180° tightly against the main portions of said lips to form a rounded upper edge on both of said lips and to provide increased structural rigidity to said shelf member.

5. The combination according to claim 4 wherein said single sheet of metal is steel.

6. The combination according to claim 1 wherein said means for facilitating attachment of said second portions of said mounting brackets comprises holes through said second portions of said mounting brackets for alignment with the vehicle sunvisor mounting holes in the vehicle roof adjacent the windshield of the vehicle.

7. The combination according to claim 1 wherein said rear lip has an angle with respect to said shelf member selected to cause the plane of said rear lip to be substantially parallel to the vehicle windshield when the vehicle shelf is mounted in the vehicle.

8. The combination according to claim 7 wherein said front lip has a generally rounded configuration.

9. A vehicle shelf for mounting near the roof of a vehicle adjacent the windshield of the vehicle, said shelf including in combination:

an elongate shelf member having a predetermined length corresponding substantially to the width of the vehicle roof, said shelf member having a front edge, a rear edge, and first and second ends, an up-turned rear lip on the rear edge thereof for location adjacent a vehicle windshield, wherein said lip extends upward from said shelf member, and an up-turned front lip on the front edge of said shelf member to prevent articles placed on said shelf member from falling off;

first and second mounting brackets adapted to be attached to the first and second ends respectively to said shelf member, each of said mounting brackets having a first portion attached to a respective end of said shelf member and extending upwardly from such respective end of said shelf member to which such bracket is attached to form an end wall and having a second portion thereon for attachment to the sunvisor mounting holes in a vehicle roof, said second portion having a first part extending inwardly at an angle to said first portion and a second part extending further inwardly from said first part toward the corresponding second part of said second portion of the other of said mounting brackets to overlie said shelf member and to suspend said shelf member a short distance downwardly from the vehicle roof substantially concealing said mounting brackets from view when said shelf member is mounted in place in a vehicle, the distance between said second portions of said mounting brackets being less than said predetermined length;

means for attaching said first and second mounting brackets to the first and second ends respectively of said shelf member; and means for facilitating the attachment of the second part of said second portion of said mounting brackets to the sunvisor mounting holes.

10. The combination according to claim 9 wherein said elongate shelf member is formed from a length of continuous extrusion.

11. The combination according to claim 10 wherein said elongate shelf member is made of extruded aluminum.

12. The combination according to claim 11 wherein said first and second mounting brackets each have a inwardly turned flange thereon for attachment to the first and second ends respectively of said shelf member and wherein said means for attaching said mounting brackets to said shelf member comprises removable fasteners.

13. The combination according to claim 12 wherein said means for facilitating attachment of said second portions of said mounting brackets comprises holes through the second parts of said second portions of said mounting brackets for alignment with the vehicle sunvisor mounting holes in the vehicle roof adjacent the windshield of the vehicle.

14. The combination according to claim 13 wherein said rear lip has an angle with respect to said shelf member selected to cause the plane of said rear lip to be substantially parallel to the vehicle windshield when the vehicle shelf is mounted in the vehicle.

15. The combination according to claim 14 wherein said front lip has a generally rounded configuration.

* * * * *